J. A. MOSHER AND W. H. TOWNSEND.
VELOCIPEDE.
APPLICATION FILED DEC. 2, 1919.
1,374,513.
Patented Apr. 12, 1921.
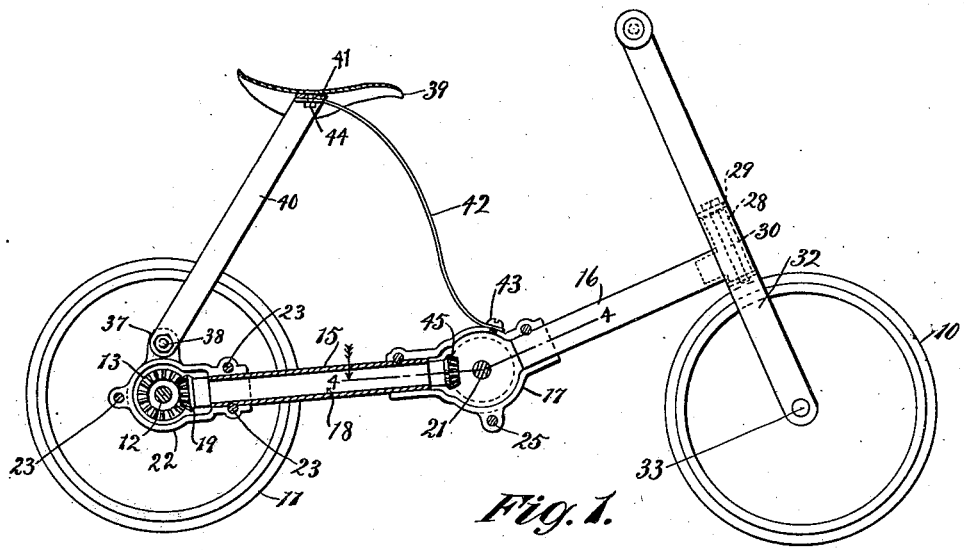
Fig. 1.
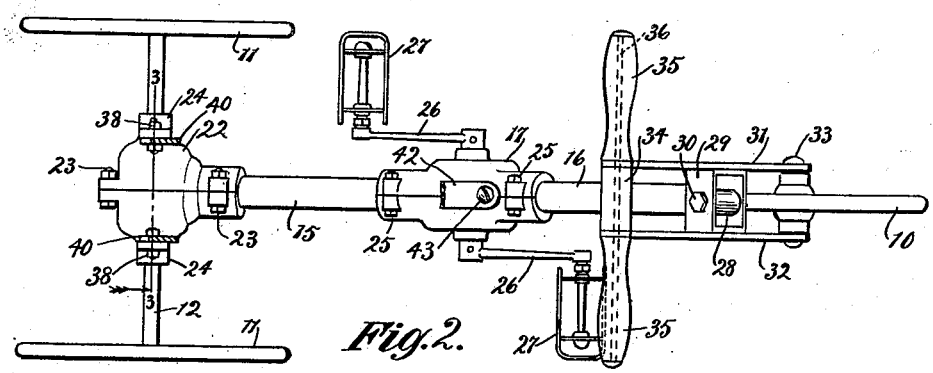
Fig. 2.
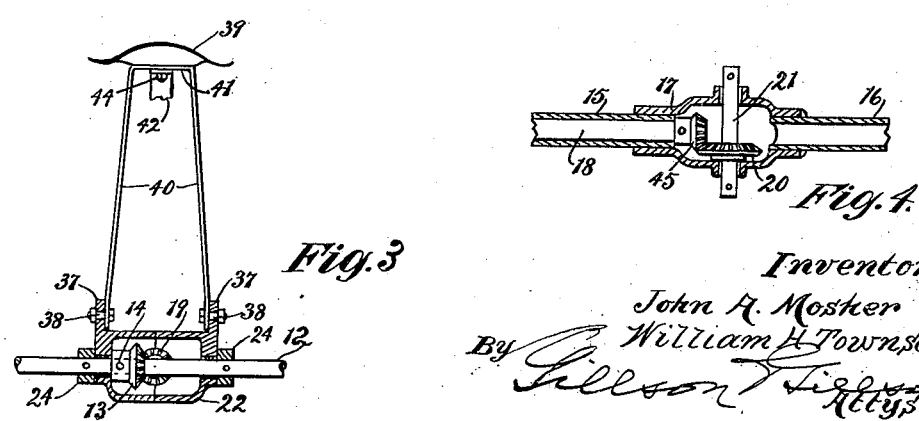
Fig. 3
Fig. 4
Inventors:
John A. Mosher
William H. Townsend
By Gillson & Fieler
Attys.

UNITED STATES PATENT OFFICE.

JOHN A. MOSHER AND WILLIAM H. TOWNSEND, OF WELLINGTON, OHIO.

VELOCIPEDE.

1,374,513.

Specification of Letters Patent.  Patented Apr. 12, 1921.

Application filed December 2, 1919. Serial No. 341,906.

*To all whom it may concern:*

Be it known that we, JOHN A. MOSHER and WILLIAM H. TOWNSEND, citizens of the United States, and residents of Wellington, county of Lorain, and State of Ohio, have jointly invented certain new and useful Improvements in Velocipedes, of which the following is a specification, and which are illustrated in the accompanying drawings, forming a part thereof.

This invention relates to velocipedes, and has as an object the provision of a child's velocipede of improved construction.

In velocipedes now on the market the cranks are commonly placed directly on the front axle, and hence they are "geared" one to one. Moreover, the frame is too complicated for cheap manufacture, and such vehicles are not convenient for girls' use. These defects are avoided by the structure provided by the present invention.

An illustrative embodiment of the invention is shown in the accompanying drawings, in which—

Figure 1 is a side elevation, partly in central vertical section;

Fig. 2 is a plan view with the saddle broken off;

Fig. 3 is a detail section on line 3—3 of Fig. 2; and

Fig. 4 is a detail section on line 4—4 of Fig. 1 with the pedals omitted.

As shown the velocipede comprises a front wheel 10 and rear wheels 11, the latter mounted on a rear axle, as 12. The rear axle is shown as provided with a bevel gear 13, rigidly secured thereto, as by a pin 14.

The frame of the velocipede is shown as comprising a single fore and aft member consisting of two pieces of tubing, as 15 and 16, united by means of the crank gear case 17. The rear element 15 of the frame member may be utilized as a housing for the propeller shaft 18, which is shown as carrying a bevel driving gear 19 on its rear end, which gear meshes with and drives gear 13, and a bevel gear 45 on its front end which is in mesh with and driven by a bevel gear 20 on the crank shaft 21.

The frame tube 15 may be secured to the rear axle by means of a gear casing, as 22, which, for convenience in assembly, is preferably formed in two parts, shown as secured together by bolts, as 23, two of which bolts are shown as effective to securely clamp the end of the tube 15 between the two portions of the case. The case 22 may be confined on the axle 12 to prevent displacement thereon by means of collars 24 pinned to the axle.

The crank gear case 17 is also shown as comprising two parts secured together by bolts 25, which securing bolts are effective to securely clamp the adjacent ends of frame tubes 15 and 16 between the two parts of the casing, thus producing a simple and cheap frame construction and an efficient housing for the propeller shaft 18. The casings 17 and 22 may be supplied with a suitable heavy transmission oil and thus insure long life of the driving gearing. Cranks 26, supplied with pedals 27 of usual types, may be rigidly secured to the crank shaft 21 in any suitable manner, as by being pinned thereon.

For a pivotal connection of the frame member 16 with the front wheel 10, the element 16 of the member is shown as provided with a T element 28, standing in a box-like steering head 29, and as connected thereto by a pin 30 passing through the upper and lower horizontal sides of the steering head and through the T element. When this arrangement is utilized a simple and efficient front fork may be provided by a pair of parallel fork members 31 and 32, secured to the steering head 29 and mounted on the front axle 33.

A handle bar is shown as comprising a filler piece 34 of the proper length to pass between the fork members 31 and 32, and handles 35 of the desired length. The block 34 and handles 35 are shown as axially bored and as having a rod 36 passed therethrough and through perforations in the upper end of the fork members 31 and 32. The ends of the rod 36 may be upset or headed over washers to secure the assembled handle bar together.

For attachment of a saddle a lug, as 37, may be cast on each half of the gear case 22, and preferably these lugs will be located, as shown, in vertical alinement with the bearing of the gear case upon the rear axle. These lugs are shown as perforated for the reception of bolts 38. A support for a saddle 39, shown as comprising two uprights 40, their upper ends joined by a horizontal portion 41, may be formed of a single strip of metal and may have perforated lower extremities secured one to each of the lugs 37 by means of the bolts 38. A third supporting member for the saddle 39 is shown as comprising an elongated spring 42, and may be secured to the crank gear case 17, as by screw 43, and to the horizontal member 41 of the rear supporting member by the bolt 44, which secures the saddle to the assembled support. If the bolts 38, which secure the rear saddle support to the lugs on the gear case 22, are not caused to clamp the rear support so tightly as to prevent fore and aft swaying of said rear support, the action of the spring front support 42 will give a desirably resilient support of the saddle.

The form of frame and saddle support disclosed will provide a structure which will be as convenient for girls' use as for boys, since there is no horizontal frame member projecting forward from the level of the saddle to interfere with skirts.

We claim as our invention—

1. In a velocipede, in combination, a rear axle having a ground wheel at each end thereof, driving gearing connected to the central portion of said axle, a gear case mounted on said axle and inclosing said gearing, a front steering head, and a frame comprising a single longitudinal member connected at its rear end to said gear case and at its front end to the steering head.

2. In a velocipede, in combination, a rear axle having a ground wheel at each end thereof, driving gearing connected to the central portion of said axle, a gear case mounted on said axle and inclosing said gearing, a front steering head, a single longitudinal frame member comprising front and rear tubular elements, and a crank gear case connecting said front and rear elements, a crank shaft and crank gear mounted in said crank gear case, said rear tubular element connected to said gear case, a propeller shaft housed in said rear element and carrying at its rear end a driving gear in mesh with said rear axle gearing and at its front end a gear in mesh with said crank gear and crank mounted on said crank shaft.

3. In a velocipede, in combination, a rear axle having a ground wheel at each end and a gear case mounted on the central portion thereof, a front steering head, a single longitudinal frame member connected to said gear case and to said steering head and having a crank gear case intermediate its ends, a pair of saddle supports spaced apart at their lower ends and attached to said gear case, a resilient saddle support attached at its lower end to said crank gear case, and a saddle attached to the upper ends of said saddle supports.

4. In a velocipede, in combination, a rear axle having a ground wheel at each end and a gear case mounted on the central portion thereof, a front steering head, a single longitudinal frame member connected to said gear case and to said steering head and having a crank gear case intermediate its ends, a pair of saddle supports spaced apart at their lower ends and attached to said gear case, a saddle support attached at its lower end to said crank gear case, and a saddle attached to the upper ends of said saddle supports.

JOHN A. MOSHER.
WILLIAM H. TOWNSEND.